(12) United States Patent
Hong

(10) Patent No.: US 7,190,425 B2
(45) Date of Patent: Mar. 13, 2007

(54) LIQUID CRYSTAL DISPLAY MODULE

(75) Inventor: Hyung Ki Hong, Seoul (KR)

(73) Assignee: LG.Philips LCD Co., Ltd., Seoul (KR)

(*) Notice: Subject to any disclaimer, the term of this patent is extended or adjusted under 35 U.S.C. 154(b) by 20 days.

(21) Appl. No.: 10/742,915

(22) Filed: Dec. 23, 2003

(65) Prior Publication Data

US 2004/0179154 A1 Sep. 16, 2004

(30) Foreign Application Priority Data

Mar. 13, 2003 (KR) .................... 10-2003-0015676

(51) Int. Cl.
*G02F 1/1335* (2006.01)

(52) U.S. Cl. ........................................ 349/63

(58) Field of Classification Search .............. 349/65, 349/113, 63
See application file for complete search history.

(56) References Cited

U.S. PATENT DOCUMENTS 6,048,071 A * 4/2000 Sawayama ................ 362/603
6,642,976 B2 * 11/2003 Umemoto et al. .......... 349/65
6,742,921 B2 * 6/2004 Umemoto et al. .......... 362/561

* cited by examiner

*Primary Examiner*—James A. Dudek
(74) *Attorney, Agent, or Firm*—McKenna Long & Aldridge LLP

(57) ABSTRACT

A liquid crystal display module according to an embodiment of the present invention includes a lamp to generate light; a light guide panel to convert an incident light from the lamp into a surface light, having a first refractive index; a low refractive index layer fixed on the light guide panel, having a second refractive index, which is relatively lower than the first refractive index, so as to have the light incident to the light guide panel totally reflected on the border area with the light guide panel; and a reflective type of liquid crystal display panel to realize a picture by reflecting the light going out from the low refractive index layer.

14 Claims, 6 Drawing Sheets

LIQUID CRYSTAL DISPLAY MODULE

This application claims the benefit of the Korean Patent Application No. 10-2003-0015676 filed on Mar. 13, 2003, which is hereby incorporated by reference for all purposes as if fully set forth herein.

BACKGROUND OF THE INVENTION

1. Field of the Invention

The present invention relates to a liquid crystal display module, and more particularly to a liquid crystal display module that can be illuminated with minimal light loss.

2. Description of the Related Art

Generally, a liquid crystal display module requires a separate light source because it is not a self-luminating device. Such liquid crystal display modules can be classified as a transmitting type and a reflective type in accordance with the type of light source used. The transmitting type of liquid crystal display module has a backlight unit facing a lower substrate of two substrates between which liquid crystal is injected, so as to transmit the light being incident from the backlight unit toward a plane of incidence. In contrast, the reflective type of liquid crystal display device has a specular surface formed on the lower substrate of two substrates between which liquid crystal is injected, so as to reflect the external light through the upper substrate to lower substrate toward a display surface.

The reflective type of liquid crystal display module realizes a picture using an external light, thus it is restricted from being used in a dark place. Therefore, the reflective type of liquid crystal display module with a front light unit is suggested.

FIG. 1 is a sectional view illustrating a reflective type of liquid crystal display module.

Referring to FIG. 1, the reflective type of liquid crystal display module includes a front light unit FL and a liquid crystal display panel LP located on the front light unit FL.

The front light unit FL includes a lamp 14 generating light, a lamp housing 4 equipped with the lamp 14, a light guide panel 2 to convert the light coming from the lamp 14 into a surface light and optical sheets having a diffusion sheet, and a phase difference compensation sheet and a polarizing sheet 18 which are fixed to the outgoing surface of the light guide panel in order to increase the efficiency of the light incident to the liquid crystal display panel LP.

The lamp 14 can be a cold cathode fluorescent lamp. And the light generated at the lamp 14 is incident to the light guide panel 2 through the incident surface that is adjacent the light guide panel 2.

The lamp housing 4 has a reflective inner surface in the inner surface covering the lamp 14 to reflect the light from the lamp 14 to the incidence surface of the liquid guide panel 2.

The light guide panel 2 takes the incident light from the lamp 14 and converts it into surface light to illuminate a position located far away from the lamp 14. Such a light guide panel 2 is made to have its incident surface and outgoing surface be perpendicular to each other. The light guide panel 2 has a horizontal outgoing surface to increase the efficiency of light and a tilt rear surface facing the outgoing surface. Either a groove or protrusion pattern is formed on at least one of the rear surface and the outgoing surface.

The polarizing sheet 18 transmits a specific linear polarized light from the external light and intercepts other polarizing components. The phase difference compensation sheet 10 converts a specific linearly-polarized light, which is transmitted from the polarizing sheet 18, into a circularly-polarized light. The diffusion sheet 8 is formed between the phase difference compensation sheet 10 and the upper substrate 20 to diffuse the light going out through the outgoing surface of the light guide panel 2 to the whole area. In this way, the light generated at the front light unit FL is incident to the liquid crystal display panel LP.

The liquid crystal display panel LP has liquid crystal cells arranged between the upper and lower substrates 20 and 22 in active matrix and has a thin film transistor installed to switch video signals at each of the liquid crystal cells. The refractive index of each liquid crystal cell is changed in accordance with the video signal, thereby displaying a picture corresponding to the video signal. That is, the liquid crystal display panel LP has its liquid crystal driven by the voltage difference between a common electrode of the upper substrate 20 and the a pixel electrode of the lower substrate 22 so as to selectively transmit the light from the front light unit FL, thereby displaying the picture. That is, a reflective electrode 6 is formed on the lower substrate 22 of the liquid crystal display panel LP, the reflective electrode 6 reflects the external light transmitted through the upper substrate 20 and the liquid crystal 12 toward the upper substrate 20.

The liquid crystal display module should have a gap between the light guide panel 2 and the polarizing sheet 18, and also between the light guide panel 2 and a touch panel (not shown). Accordingly, there is a problem in that the liquid crystal display module becomes too thick. In order to solve this problem, active study of a liquid crystal display module in which the light guide panel 2 and the optical sheets 8, 10 and 18 are integrated has recently progressed.

As illustrated in FIG. 2, the liquid crystal display module in which the light guide panel and the optical sheets are integrated, the optical sheets 8, 10 and 18 are formed on the outgoing surface of the light guide panel 2, thereby reducing the thickness of the front light unit FL. However, there is a problem in that the light going out from the light guide panel 2 is lost when passing through the polarizing sheet 18, the phase difference compensation sheet 10 and the diffusion sheet 8. This is because a total reflection condition existing in the air between the light guide panel 2 and the optical sheets 8, 10 and 18 cannot be realized between the light guide panel 2 and other optical sheets 8, 10 and 18 affixed thereon. Further, there is a problem in that the light, which should progress within the light guide panel 2, is not reflected at the border between the light guide panel 2 and the polarizing sheet 18, thereby generating light loss.

SUMMARY OF THE INVENTION

Accordingly, the present invention is directed to a liquid crystal module that substantially obviates one or more of the problems due to limitations and disadvantages of the related art.

An advantage of the present invention is to provide a liquid crystal display module that can be illuminated without any light loss.

In order to achieve these and other advantages of the invention, a liquid crystal display module according to an aspect of the present invention includes a lamp to generate light; a light guide panel to convert an incident light from the lamp into a surface light, having a first refractive index; a low refractive index layer stuck onto the light guide panel, having a second refractive index, which is relatively lower than the first refractive index, so as to have the light incident to the light guide panel totally reflected on the border area with the light guide panel; and a reflective type of liquid crystal display panel to realize a picture by reflecting the light going out from the low refractive index layer.

Herein, a condition in which light is totally reflected on the border surface of the light guide panel and the low refractive index layer is 90°−sin$^{-1}$(1/the first refractive index)>sin$^{-1}$(the second refractive index/the first refractive index).

Herein, the first refractive index is 1.7 and the second refractive index is 1.35.

The liquid crystal display module further includes a polarizing sheet fixed to the low refractive index layer; a phase difference compensation sheet fixed to the polarizing sheet; and a diffusion sheet fixed to the phase difference compensation sheet.

The reflective type of liquid crystal display panel includes a lower substrate having a reflective electrode formed, the reflective electrode reflects the light going out from the low refractive layer; and an upper substrate facing the lower substrate with liquid crystal therebetween.

The reflective type of liquid crystal display panel includes an upper substrate having a reflective electrode formed and facing the light guide panel, to which the diffusion sheet is stuck, with liquid crystal therebetween, the reflective electrode reflects the light going out from the low refractive layer.

The liquid crystal display module further includes a condensing device located between the lamp and the light guide panel.

Herein, a condition in which light is totally reflected on the border surface of the light guide panel and the low refractive index layer is 90°−condensed degree by condensing device>sin$^{-1}$(the second refractive index/the first refractive index).

Herein, the first refractive index is 1.5 and the second refractive index is

The liquid crystal display module further includes a polarizing sheet fixed to the low refractive index layer; a phase difference compensation sheet fixed to the polarizing sheet; and a diffusion sheet fixed to the phase difference compensation sheet.

The reflective type of liquid crystal display panel includes a lower substrate having a reflective electrode formed, the reflective electrode reflects the light going out from the low refractive layer; and an upper substrate facing the lower substrate with liquid crystal therebetween.

The reflective type of liquid crystal display panel includes an upper substrate having a reflective electrode formed and facing the light guide panel, to which the diffusion sheet is stuck, liquid crystal therebetween, the reflective electrode reflects the light going out from the low refractive layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

With reference to FIGS. 3 to 6, embodiments of the present invention will be explained as follows.

Figure 1:
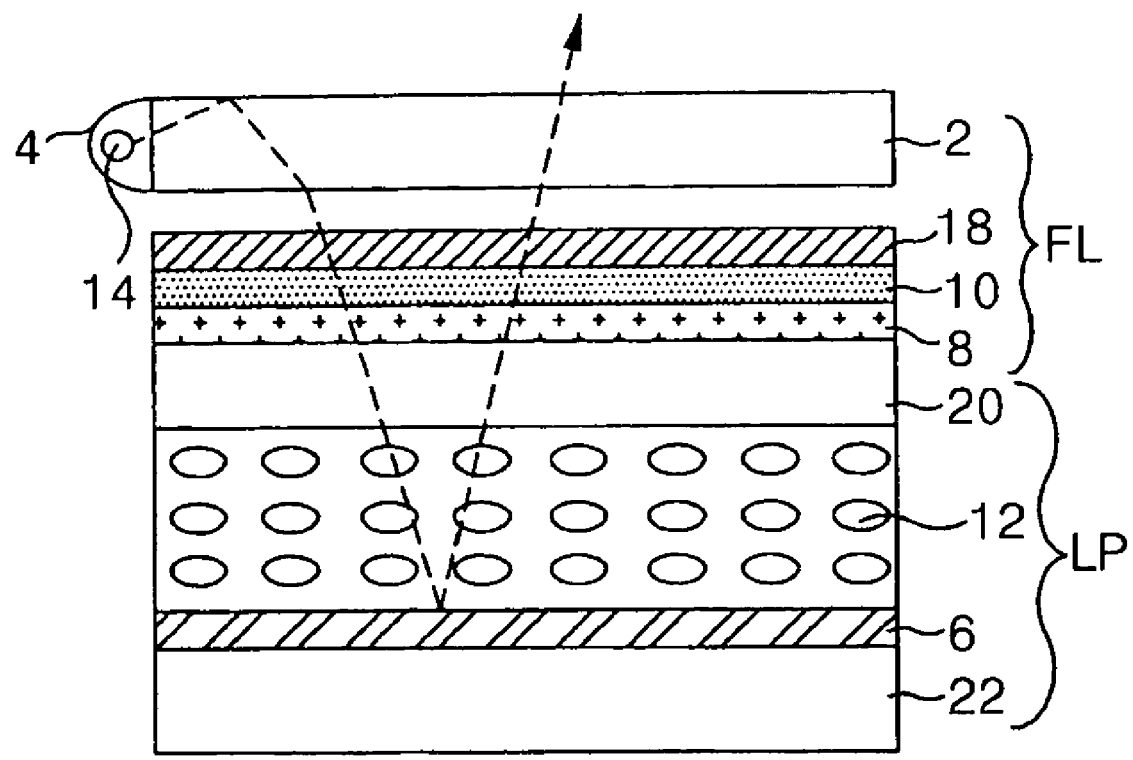
FIG. 1 is a perspective view illustrating a related art liquid crystal display module.
Figure 2:
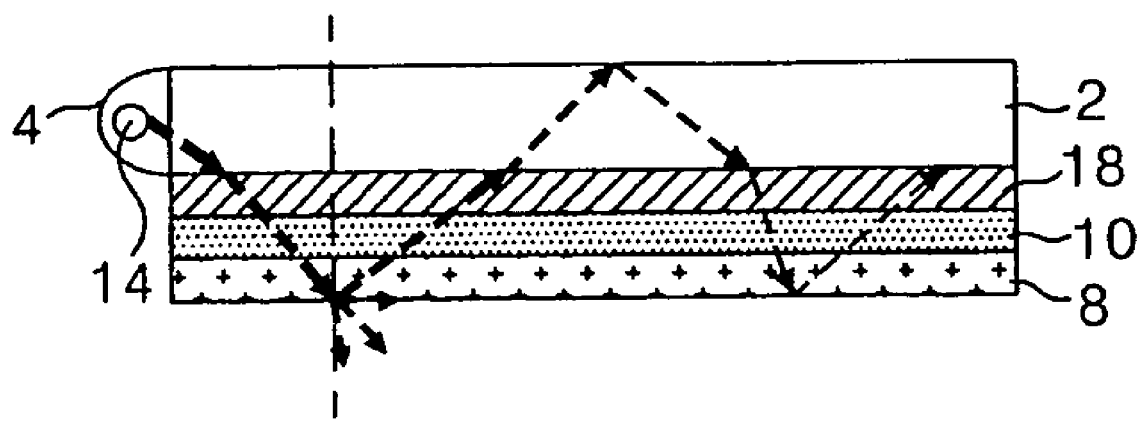
FIG. 2 is a sectional view illustrating a related art liquid crystal display module which is integrated with a light guide panel and optical sheets.
Figure 3:
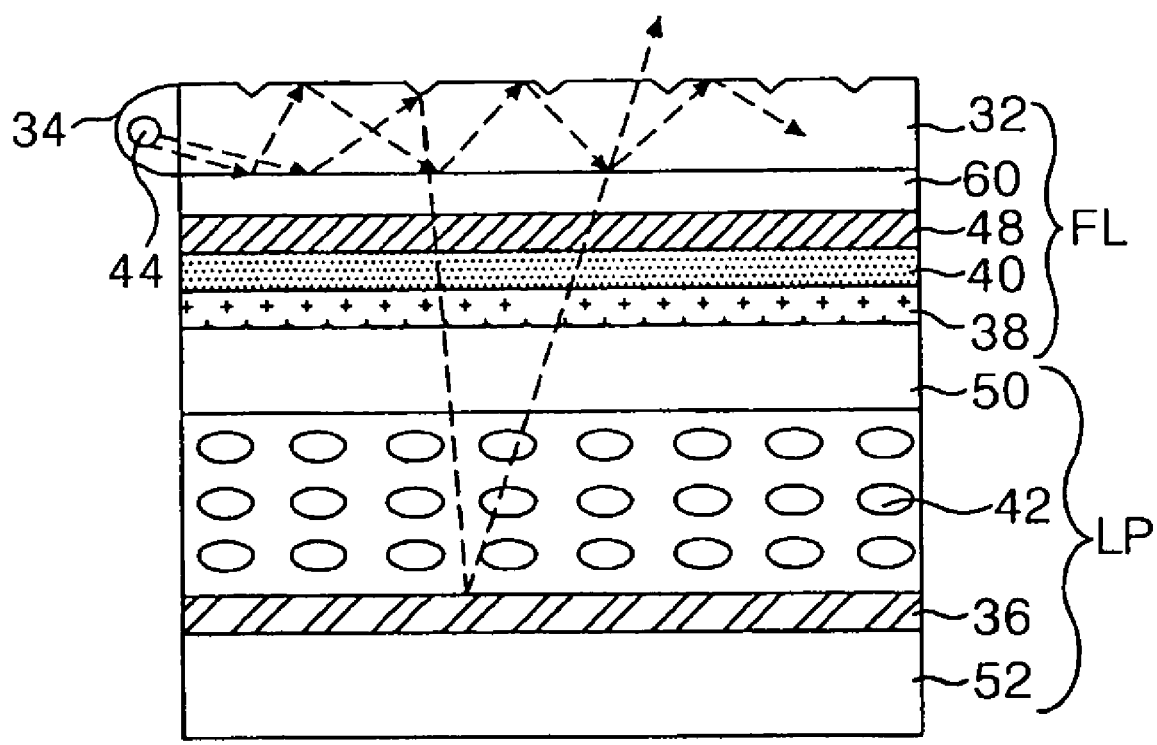
FIG. 3 is a sectional view illustrating a liquid crystal display module according to a first embodiment of the present invention.

Referring to FIG. 3, a liquid crystal display module according to a first embodiment of the present invention includes a front light unit FL and a liquid crystal display panel LP The front light unit FL includes a lamp 44 generating light, a lamp housing 34 equipped with the lamp 44, a light guide panel 32 to convert the light being incident from the lamp 44 into a surface light, a low refractive index layer 60 stuck to the outgoing surface of the light guide panel 32, and optical sheets fixed to the rear surface of the low refractive index layer 60 in order to increase the efficiency of the light incident to the liquid crystal display panel LP. The low refractive index layer 60, the optical sheets, the polarizing sheet 48 and the light guide panel 32 of the front light unit FL are integrated by using an adhesive (not shown).

The lamp 44 is mainly a cold cathode fluorescent lamp. The light generated at the lamp 44 is incident to the light guide panel 32 through the incident surface of the light guide panel 32.

The lamp housing 34 is installed to have a reflective surface in the inner surface thereof in a manner of covering the lamp 44, so as to reflect the light from the lamp 44 to the incidence surface of the liquid guide panel 32.

The light guide panel 32 converts the incident light from the lamp 44 into surface light and causes the light reach a place located far away from the lamp 44. Such a light guide panel 32 is made to have its incidence surface and outgoing surface be perpendicular to each other. The light guide panel 32 is made of a material having a relatively high refractive index, which is a first refractive index N1. On the other hand, the light guide panel 32 has a horizontal outgoing surface to increase the efficiency of light and a tilt rear surface facing the outgoing surface. And, at least one of groove and protrusion patterns are formed on at least one of the rear surface and the outgoing surface.

The low refractive index layer 60 on the outgoing surface of the light guide panel 32 is made of a material has a relatively low refractive index compared to the light guide panel 32, i.e., a second refractive index N2 that is lower than the first refractive index N1. The low refractive index layer 60 causes total reflection on the border area with the light guide panel 32 so as to propagate the light to the other area of the light guide panel 32.

The optical sheets include a polarizing sheet 48, a phase difference compensation sheet 40 and a diffusion sheet 38 which are sequentially located at the upper substrate of the liquid crystal display panel on the low refractive index layer 60.

The polarizing sheet 48 transmits a specific liner polarized light from the light incident through the light guide panel 32 and intercepts other polarizing components than that.

The phase difference compensation sheet 40 converts a specific linearly-polarized light, which is transmitted from the polarizing sheet 48, into a circularly-polarized light.

The diffusion sheet 38 is formed between the phase difference compensation sheet 40 and the upper substrate 50 to diffuse the light going out through the outgoing surface of the light guide panel 32 to the whole area. In this way, the light generated at the integrated front light unit FL is incident to the liquid crystal display panel LP through the optical sheets.

The liquid crystal display panel LP includes an upper substrate 50 and a lower substrate 52, which are facing each other with liquid crystal 42 therebetween. A black matrix, a color filter and a common electrode (not shown) are formed on the upper substrate 50. And, a thin film transistor, a pixel electrode (not shown), and a reflective electrode 36 are formed on the lower substrate 52. The liquid crystal display panel LP has its liquid crystal 42 driven by the voltage difference between a common electrode of the upper substrate 50 and the a pixel electrode of the lower substrate 52 so as to selectively reflect the light from the front light unit FL, thereby displaying the picture.

On the other hand, in order to totally reflect the light incident to the low refractive index layer 60 of the front light unit FL according to the first embodiment of the present invention, Formula 1 should be satisfied. In Formula 1, n1 represents a high refractive index and n2 represents a low refractive index.

$$90°-\sin^{-1}(1/n1)>\sin^{-1}(n2/n1) \qquad \text{[Formula 1]}$$

For example, when the first refractive index (n1) of the light guide panel 32 is 1.7 and the second refractive index (n2) of the low refractive index layer 60 is 1.35, 53° is the critical angle that satisfies the total reflection condition at the border area between the light guide panel 32 and the low refractive index layer 60. That is, if the light going out from the light guide panel 32 and incident to the low refractive index layer 60 is has its critical angle in a range of 54~90° in relation to the horizontal direction, then substantially all of the light is substantially totally reflected at the border area between the light guide panel 32 and the low refractive layer 60.

In this way, if the liquid crystal display module according to the first embodiment of the present invention satisfies Formula 1, the part of the incident light from the light guide panel is totally reflected at the low refractive index layer. Accordingly, the liquid crystal display module according to the first embodiment of the present invention has the front light unit and the liquid crystal display panel integrated, thereby reducing generated light loss.

Figure 4:
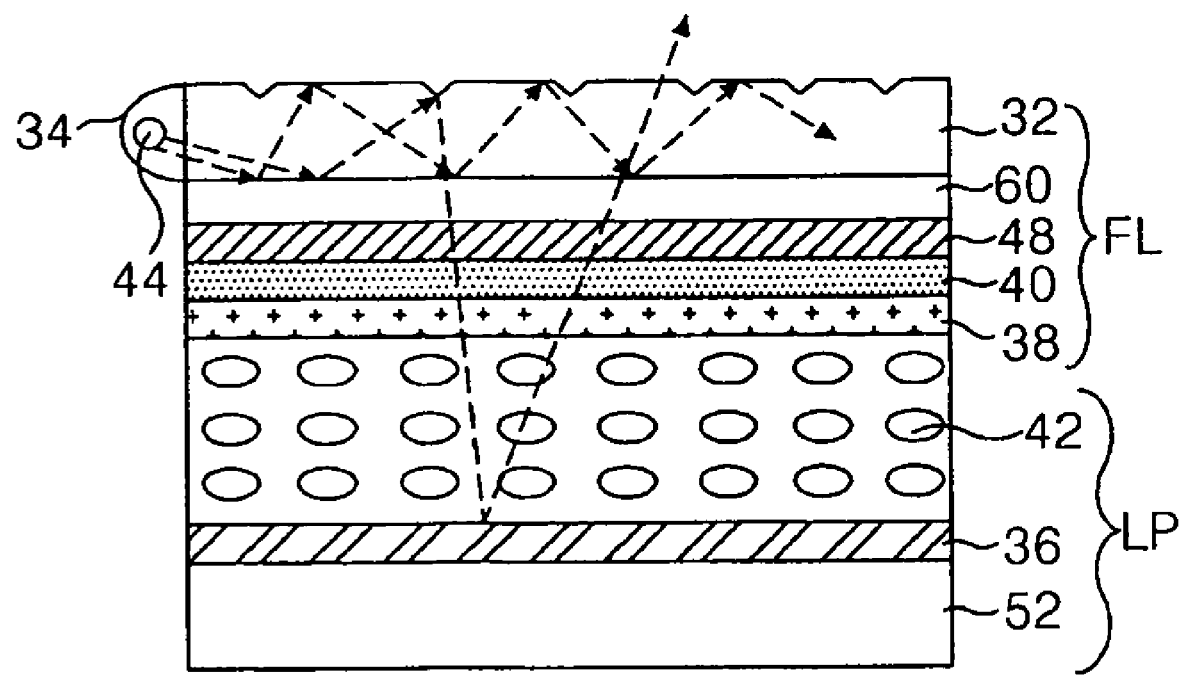
FIG. 4 is a sectional view illustrating a liquid crystal display module according to a second embodiment of the present invention.

FIG. 4 is a sectional view illustrating a liquid crystal display module according to a second embodiment of the present invention.

Referring to FIG. 4, the liquid crystal display module according to the second embodiment of the present invention, when compared with the liquid crystal display module shown in FIG. 3, has the upper substrate of the liquid crystal display removed and has the same components except that a plurality of optical sheets and a plurality of electrodes are formed on the light guide panel.

The light guide panel 32 is made of a material which has a relatively high refractive index being the first refractive index N1. The low refractive index layer 60 is made of a material that has a lower refractive index than the light guide panel 32, on the light guide panel 32, so that it is formed to have the second refractive index (n2) that is lower than the first refractive index (n1). This low refractive index layer 60 substantially reflects the light on the border area between the light guide panel 32 and the low refractive index layer 60, thereby casting the light to the other areas of the light guide panel 32.

On the other hand, in order to totally reflect the light incident to the low refractive index layer 60 of the front light unit FL according to the second embodiment of the present invention, Formula 2 should be satisfied.

$$90°-\sin^{-1}(1/n1)>\sin^{-1}(n2/n1) \qquad \text{[Formula 2]}$$

For example, when the first refractive index (n1) of the light guide panel 32 is 1.7 and the second refractive index (n2) of the low refractive index layer 60 is 1.35, 53° is the critical angle that satisfies the total reflection condition at the border area between the light guide panel 32 and the low refractive index layer 60. That is, if the incidence angle of the light going out from the light guide panel 32 and incident to the low refractive index layer 60 is in a range of 54~90°, which is higher than the critical angle, in relation to the horizontal direction, substantially all of the light is substantially reflected at the border area between the light guide panel 32 and the low refractive layer 60.

The optical sheets including the polarizing sheet, the phase difference compensation sheet and the diffusion sheet, and the black matrix, the color filter and the common electrode located on the optical sheets are formed to be integrated with each other on the low refractive index layer 60 located on the outgoing surface of the light guide panel 32. The light guide panel 32 where the integrated optical sheets and the upper patterns is formed to face the lower substrate 52 where gate lines, data lines, thin film transistors, pixel electrodes and reflective electrodes 36 are formed, with the liquid crystal 42 therebetween.

In this way, the liquid crystal display module according to the second embodiment of the present invention, if Formula 2 is satisfied, has the light incident to the light guide panel reflected by the reflective electrode without light loss and going out toward the upper substrate of the liquid crystal display panel, and at the same time, propagate to other area of the light guide panel. Further, the liquid crystal display according to the second embodiment of the present invention has the upper patterns formed on the light guide panel that is integrated with the optical sheets instead of the upper substrate. Accordingly, in the related art liquid crystal display device, the upper substrate can be reduced in weight or thickness, thereby enabling it to be made light.

Figure 5:
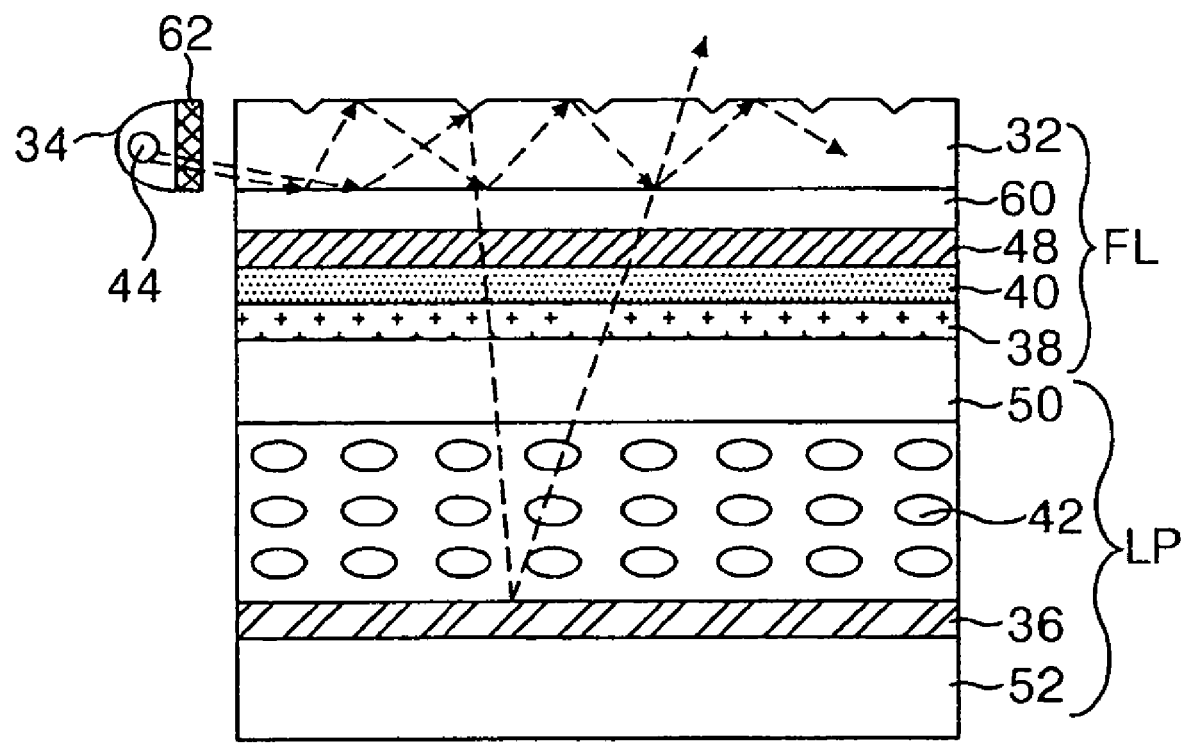
FIG. 5 is a sectional view illustrating a liquid crystal display module according to a third embodiment of the present invention.

FIG. 5 is a sectional view illustrating a liquid crystal display module according to a third embodiment of the present invention.

Referring to FIG. 5, the liquid crystal display module according to the third embodiment of the present invention, when compared with the liquid crystal display module shown in FIG. 3, has the same components except that a condensing device is additionally included in the incidence part of the light guide panel.

The condensing device 62 is formed of a plurality of prism patterns between the lamp 44 and the light guide panel 32 so as to reduce the light loss generated through an opening between the lamp 44 and the light guide panel 32. That is, the condensing device 62 condenses the light generated from the lamp 44 and the light reflected by the lamp housing 34. The condensed light is incident to the light guide panel 32 to be able to reduce the gap between the first refractive index (n1) of the light guide panel 32 and the second refractive index (n2) of the low refractive index layer 60. Such a condensing device 62 has high degree of strength, so it is not easily changed or broken and may be made of acryl resin, which has a good transitivity. For example, the condensing device 62 is made of polymethyl methacrylate (PMMA). In case that the condensing device 62 is used, the light incident to the light guide panel 32 can be totally reflected when Formula 3 is satisfied.

$$90°-(\text{condensed angle by condensing device}) > \sin^{-1}(n2/n1)$$ [Formula 3]

For example, when the first refractive index (n1) is 1.5 and the second refractive index (n2) is 1.35, the light incident to the light guide panel 32 is located in a range of 64~90° in relation to the vertical direction, the light is substantially reflected at the border area between the light guide panel 32 and the low refractive layer 60. In this case, the condensing device 62 should condense light at about 26 degrees and below in a horizontal direction in relation to the angle of light incident to the light guide panel 32.

In this way, the liquid crystal display module according to the third embodiment of the present invention forms the low refractive index layer with low refractive index on the light guide panel with high refractive index, thereby making the light incident to the light guide panel go out toward the upper substrate and at the same time completely reflected to other areas of the light guide panel. Further, the optical sheets can be fixed onto the light guide panel with the low refractive index layer therebetween, thus the thickness of the liquid crystal display module can be reduced. Further, the angle distribution of the light incident to the light guide panel is controlled by having the condensing device, thus it is possible to reduce the refractive index difference between the light guide panel of high refractive index and the low refractive index layer of low refractive index.

Figure 6:
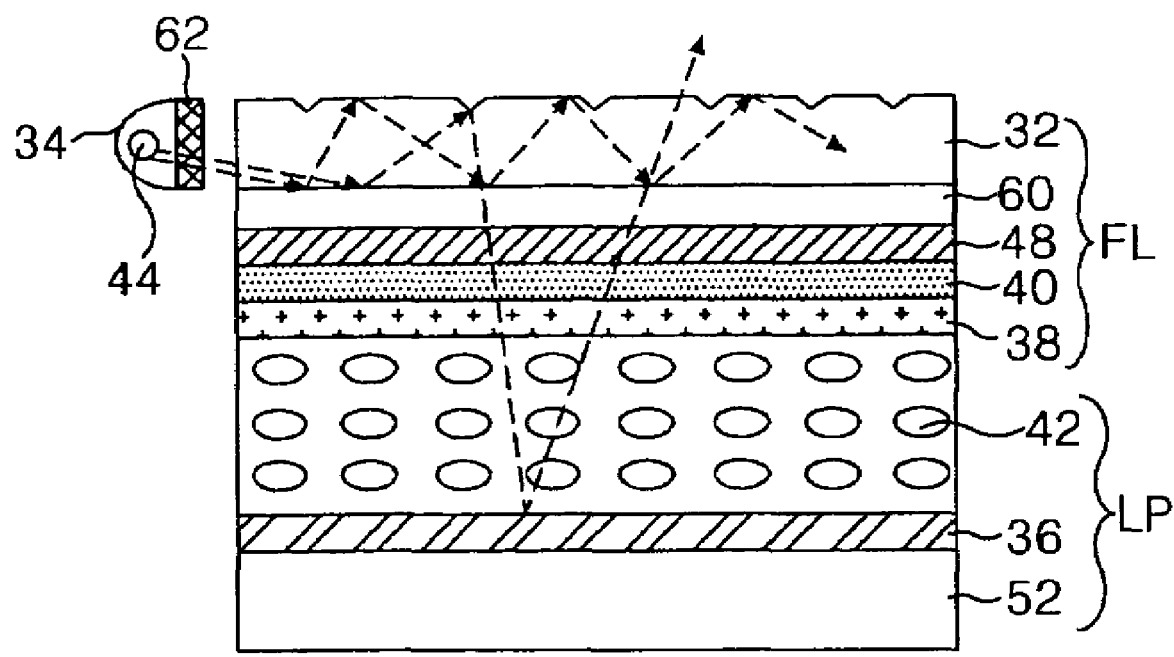
FIG. 6 is a sectional view illustrating a liquid crystal display module according to a fourth embodiment of the present invention.

FIG. 6 is a sectional view illustrating a liquid crystal display module according to a fourth embodiment of the present invention.

Referring to FIG. 6, the liquid crystal display module according to the fourth embodiment of the present invention, when compared with the liquid crystal display module shown in FIG. 5, has the same components except that a plurality of optical sheets and a plurality of upper patterns are formed on the light guide panel.

In order to make the light totally reflected on the border area between the low refractive index layer 60 of the second refractive index (n2) and the light guide panel 32 of the first refractive index (n1) of the liquid crystal display module according to the fourth embodiment of the present invention, Formula 4 should be satisfied.

$$90°-(\text{condensed angle by condensing device}) > \sin^{-1}(n2/n1)$$ [Formula 4]

For example, when the first refractive index (n1) is 1.5 and the second refractive index (n2) is 1.35, the light incident to the light guide panel 32 is located in a range of 64~90° in relation to the vertical direction, the light is totally reflected at the border area between the light guide panel 32 and the low refractive layer 60. In this case, the condensing device 62 should condense light at about 26 degree and below in a horizontal direction in relation to the angle of light incident to the light guide panel 32.

The optical sheets including the polarizing sheet, the phase difference compensation sheet and the diffusion sheet, and the black matrix, the color filter and the common electrode located on the optical sheets are formed to be integrated with each other on the low refractive index layer 60 located on the outgoing surface of the light guide panel 32. The light guide panel 32 where the integrated optical sheets and the upper patterns is formed to face the lower substrate 52 where gate lines, data lines, thin film transistors, pixel electrodes and reflective electrodes 36 are formed, with the liquid crystal 42 therebetween.

In this way, the liquid crystal display module according to the fourth embodiment of the present invention forms the low refractive index layer with low refractive index on the light guide panel with high refractive index, thereby making the light incident to the light guide panel go out toward the upper substrate and at the same time totally reflected and propagate to other area of the light guide panel. Further, the liquid crystal display module according to the fourth embodiment of the present invention forms the upper patterns on the light guide panel instead of on the upper substrate. Accordingly, the liquid crystal display module according to the fourth embodiment of the present invention can reduce the weight and thickness of the upper substrate of the liquid crystal display, thereby making it lighter. In addition, the liquid crystal display module according to the fourth embodiment of the present invention includes the condensing device to control the angle distribution of the light incident to the light guide panel, thereby reducing the difference in the refractive index between the light guide panel having a high refractive index and the low refractive index layer having a low refractive index.

On the other hand, when sticking a touch panel to the light guide panel of the liquid crystal display module according to the first to fourth embodiments of the present invention, the low refractive index layer can be additionally formed between the touch panel and the light guide panel in order to prevent the light going out from the light guide panel from propagating toward the touch panel.

As described above, the liquid crystal display module according to the present invention forms the low refractive index layer on the light guide panel with one having a high refractive index, thereby having the light incident to the light guide panel go out toward the upper substrate and at the same time reflected and propagate to other areas of the light guide panel by the reflective electrode of the lower substrate after the light passes the liquid crystal without light loss. Further, the liquid crystal display module according to the present invention can reduce the weight and thickness of the upper substrate of the liquid crystal display. Further, the liquid crystal display module according to the present invention has the condensing device controlling the angle distribution of the light incident to the light guide panel, thereby making it possible to reduce the refractive index difference between the light guide panel having high refractive index and the low refractive index layer having low refractive index. In addition, the liquid crystal display module has a touch panel attached directly onto the light guide panel, thereby making the property of light improved and its assembly easy.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a lamp generating light;
   a light guide panel that converts an incident light from the lamp into a surface light, said light guide panel having a first refractive index;
   a low refractive index layer on the light guide panel having a second refractive index which is lower than the first refractive index, reflecting the light incident to the light guide panel on the border area;
   a reflective type of liquid crystal display panel that illuminates a picture by reflecting the light coming from the low refractive index layer; and
   a condensing device located between the lamp and the light guide panel, said condensing device controls the angle distribution of the incident light to the light guide panel to reduce the difference between the first refractive index and the second refractive index.

2. The liquid crystal display module according to claim 1, wherein the low refractive index layer is adhered to the light guide panel.

3. The liquid crystal display module according to claim 1, wherein a condition in which light is totally reflected on the border surface of the light guide panel and the low refractive index layer is defined by $90°-\sin^{-1}(1/\text{the first refractive index})>\sin^{-1}(\text{the second refractive index/the first refractive index})$.

4. The liquid crystal display module according to claim 1, wherein the first refractive index is 1.7 and the second refractive index is 1.35.

5. The liquid crystal display module according to claim 1, further comprising:
   a polarizing sheet on the low refractive index layer;
   a phase difference compensation sheet on the polarizing sheet; and
   a diffusion sheet on the phase difference compensation sheet.

6. The liquid crystal display module according to claim 5, wherein the polarizing sheet is adhered to the low refractive index layer;
   the phase difference compensation sheet is adhered to the polarizing sheet; and
   the diffusion sheet is adhered to the phase difference compensation sheet.

7. The liquid crystal display module according to claim 5, wherein the reflective type of liquid crystal display panel includes:
   a lower substrate having a reflective electrode, the reflective electrode reflects the light going out from the low refractive layer; and
   an upper substrate facing the lower substrate with liquid crystal therebetween.

8. The liquid crystal display module according to claim 5, wherein the reflective type of liquid crystal display panel includes:
   an upper substrate having a reflective electrode facing the light guide panel with liquid crystal therebetween, wherein the reflective electrode reflects the light going out from the low refractive layer.

9. The liquid crystal display module according to claim 1, wherein a condition in which light is totally reflected on the border surface of the light guide panel and the low refractive index layer is defined by $(90°-(\text{condensed angle by condensing device}))>\sin^{-1}(\text{the second refractive index/the first refractive index})$.

10. The liquid crystal display module according to claim 1, wherein the first refractive index is 1.5 and the second refractive index is 1.35.

11. The liquid crystal display module according to claim 1, further comprising:
    a polarizing sheet on the low refractive index layer;
    a phase difference compensation sheet on the polarizing sheet; and
    a diffusion sheet on the phase difference compensation sheet.

12. The liquid crystal display module according to claim 11, wherein the polarizing sheet is adhered to the low refractive index layer;
    the phase difference compensation sheet is adhered to the polarizing sheet; and
    the diffusion sheet is adhered to the phase difference compensation sheet.

13. The liquid crystal display module according to claim 11, wherein the reflective type of liquid crystal display panel includes:
    a lower substrate having a reflective electrode, the reflective electrode reflecting the light going out from the low refractive layer; and
    an upper substrate facing the lower substrate with liquid crystal therebetween.

14. The liquid crystal display module according to claim 11, wherein the reflective type of liquid crystal display panel includes:
    an upper substrate having a reflective electrode facing the light guide panel with liquid crystal therebetween, the reflective electrode reflecting the light going out from the low refractive layer.

* * * * *